A. T. WILDEY.
TRACTOR WHEEL.
APPLICATION FILED APR. 3, 1916.
1,212,721.
Patented Jan. 16, 1917.
2 SHEETS—SHEET 1.
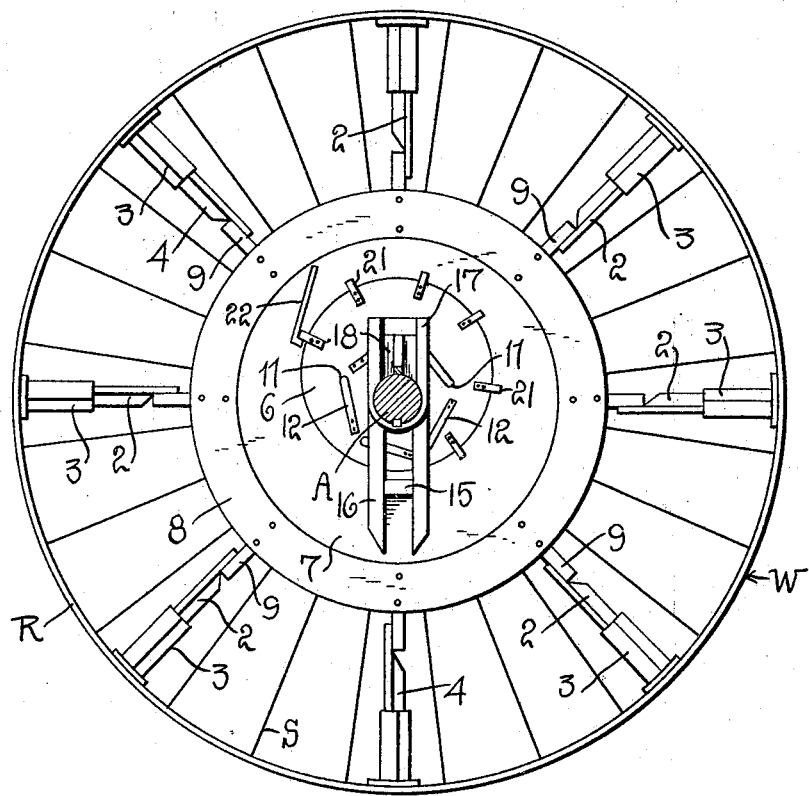
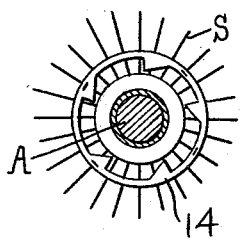
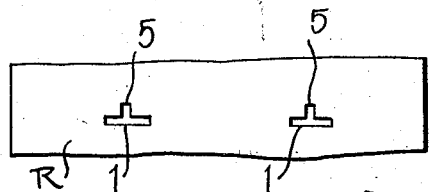
Inventor
ARTHUR T. WILDEY
By Watson E. Coleman
Attorney

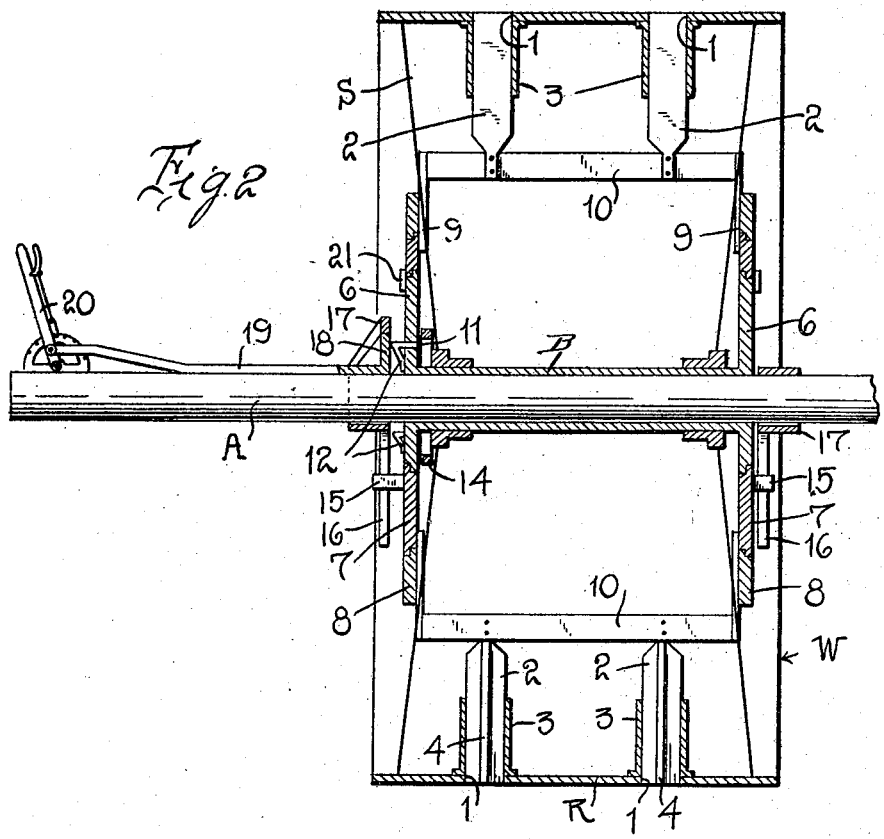

UNITED STATES PATENT OFFICE.

ARTHUR T. WILDEY, OF HONCUT, CALIFORNIA, ASSIGNOR OF ONE-THIRD TO J. B. JOHNSON, OF MARYSVILLE, CALIFORNIA.

TRACTOR-WHEEL.

1,212,721. Specification of Letters Patent. Patented Jan. 16, 1917.

Application filed April 3, 1916. Serial No. 88,625.

*To all whom it may concern:*

Be it known that I, ARTHUR T. WILDEY, a citizen of the United States, residing at Honcut, in the county of Butte and State of California, have invented certain new and useful Improvements in Tractor-Wheels, of which the following is a specification, reference being had to the accompanying drawings.

This invention relates to certain improvements in tractor wheels and it is an object of the invention to provide a wheel of this general character having novel and improved means whereby grouters or lugs may be readily adjusted into or out of operative position relative to the rim of the wheel.

Furthermore it is an object of the invention to provide a wheel of this general character having novel and improved means whereby the adjustment of the grouters or lugs is afforded through the medium of members movable relative to the axial center of the wheel.

The invention consists in the details of construction and in the combination and arrangement of the several parts of my improved wheel whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view in elevation of a traction wheel constructed in accordance with an embodiment of my invention; Fig. 2 is a transverse vertical sectional view of the device as herein embodied, certain of the parts being shown in elevation; Fig. 3 is a fragmentary view in elevation illustrating the coacting disks and annular member, as herein included, the axle being shown in section; Fig. 4 is a view in perspective of one of the lugs or grouters, detached; Fig. 5 is a fragmentary view in plan of the rim of the wheel illustrating the slots therein through which the lugs or grouters are adapted to be extended; and Fig. 6 is a fragmentary view partly in elevation and partly in section illustrating the toothed wheel as herein employed.

As disclosed in the accompanying drawings, A denotes a stationary axle upon which is mounted a tractor wheel W of conventional form and provided with the broad rim R. The rim R at predetermined intervals is provided with the transversely arranged pairs of slots 1 through which the lugs or grouters 2 are adapted to be extended, said lugs or grouters 2 being slidably mounted within the guide members 3 extending inwardly and radially of the rim R. The wheel W is adapted to be driven in any desired manner.

As herein disclosed, each of the lugs or grouters 2 is provided with a longitudinally disposed and laterally directed flange 4 passing through a complemental recess 5 in communication with the slot 1, and it is to be understood that each of the guide members 3 has its bore of a configuration in cross section similar to the grouter or lug 2.

Loosely mounted upon the axle A is an elongated sleeve B having at each side of the wheel W an eccentric disk 6 which has rotatably mounted thereon the second eccentric disk 7 which is loosely mounted within the annular member 8.

Radiating from the annular members 8 are the arms 9 and the corresponding arms 9 of the members 8 are tied or connected by the cross members 10 extending in radial alinement with the pairs of lugs or grouters 2 and operatively connected therewith, whereby it will be perceived that upon relative movements of the disks 6 and 7 and the annular members 8, the lugs or grouters 2 may be retracted within the periphery of the rim R or extended a predetermined distance therebeyond, as the requirements of practice may necessitate.

The disk 6 at the outer side of the wheel has disposed therethrough the inwardly directed pins 11 carried by the spring arms 12 secured to the outer face of said disk 6 and which, when forced inwardly through the disk 6, are adapted to operatively engage the toothed wheel 14 secured to the spokes S of the wheel W and arranged concentrically to the axle A.

With the pins 11 operatively engaged with the teeth of the ratchet wheel 14, it will be observed that the disk 6 will be caused to rotate about the axle A and the rotation of said disk 6 within the disk 7 will result in a raising or lowering of the annular member 8, whereby the grouters or lugs 2 will be retracted inwardly of the periphery of the lower part of the rim R or caused to project a predetermined distance therebeyond.

In order to assure the annular member 8 moving in a vertical path, I provide the disk 7 with the outstanding lug 15 positioned between the parallel members 16 of the frame 17 fixed to the axle A.

The upper portion of the frame 17 serves as a guide for the sliding plate 18 which, upon being moved inwardly toward the disk 6, serves to force the pins 11 inwardly. As herein embodied, the plate 18 is carried by the endwise movable rod 19 resting upon the axle A and adapted to be reciprocated in a conventional manner through the medium of the lever 20. The disk 6 is also provided with the radially directed arms 21 overlying the disk 7 and serving as stops with which the manually operated spring catch 22 coacts to hold said disk 6 against movement independently of the disk 7 when the pins 11 are out of engagement with the ratchet wheel 14, whereby it will be perceived that an adjustment of the annular member 8 will be maintained.

From the foregoing description, it is thought to be obvious that a wheel constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. In combination with an axle and a traction wheel mounted thereon, a grouter supported by the rim of the wheel and adapted to extend therethrough, an eccentric disk loosely mounted on the axle, means for causing the disk to rotate in unison with the wheel, a second eccentric disk rotatably supported by the first disk, arms carried by one of the eccentric disks and overlying the second eccentric disk, a releasable catch carried by the second eccentric disk and coacting with the arms of the other eccentric disk for holding the disks against relative independent movement in one direction, an annular member rotatably supported by the second disk, and operative connections between the annular member and the grouter.

2. In combination with an axle and a traction wheel mounted thereon, a grouter supported by the rim of the wheel and adapted to extend therethrough, an eccentric disk loosely mounted on the axle, means for causing the disk to rotate in unison with the wheel, a second eccentric disk rotatably supported by the first disk, arms carried by one of the eccentric disks and overlying the second eccentric disk, a releasable catch carried by the second eccentric disk and coacting with the arms of the other eccentric disk for holding the disks against relative independent movement in one direction, an annular member rotatably supported by the second disk, coacting means carried by the axle and the second disk for causing the annular member to travel in substantially a straight path upon rotation of the first named disk with the wheel, and operative connections between the annular member and the grouter.

3. In combination with an axle and a traction wheel mounted thereon, a grouter supported by the rim of the wheel and adapted to extend therethrough, an eccentric disk loosely mounted on the axle, means for causing the disk to rotate in unison with the wheel, a second eccentric disk rotatably supported by the first disk, an annular member rotatably supported by the second disk, parallel members fixed to the axle and overlying the second disk, a lug carried by the second disk extending between the parallel members whereby the annular member is caused to travel in substantially a straight path upon rotation of the first named disk with the wheel, and an operative connection between the annular member and the grouter.

4. In combination with an axle and a traction wheel mounted thereon, a grouter supported by the rim of the wheel and adapted to extend therethrough, an eccentric disk loosely mounted on the axle, a toothed wheel carried by the wheel and concentric to the axle, a movable pin carried by the disk and adapted to coact with the toothed wheel, means for adjusting the pin into engagement with the toothed wheel, and means under control of the eccentric disk for imparting in and out movement to the grouter.

5. In combination with an axle and a traction wheel mounted thereon, a grouter supported by the rim of the wheel and adapted to extend therethrough, an eccentric disk loosely mounted on the axle, a toothed wheel carried by the wheel and concentric to the axle, a movable pin carried by the disk and adapted to coact with the toothed wheel, means for adjusting the pin into engagement with the toothed wheel, said pin being normally out of contact with the toothed wheel, and means under control of the eccentric disk for imparting in and out movement to the grouter.

6. In combination with an axle and a traction wheel mounted thereon, a grouter supported by the rim of the wheel and adapted to extend therethrough, an eccentric disk loosely mounted on the axle, a toothed wheel carried by the wheel and concentric to the axle, a movable pin carried by the disk and adapted to coact with the toothed wheel, means carried by the axle for forcing the pin into engagement with the toothed wheel, and means under control of the eccentric disk for imparting in and out movement to the grouter.

7. In combination with an axle and a traction wheel mounted thereon, a grouter supported by the rim of the wheel and adapted to extend therethrough, an eccentric disk loosely mounted on the axle, a toothed wheel carried by the wheel and concentric to the axle, a movable pin carried by the disk and adapted to coact with the toothed wheel, a slidable member carried by the axle and coacting with the pin for forcing the pin into engagement with the ratchet wheel, and means under control of the eccentric disk for imparting in and out movement to the grouter.

In testimony whereof I hereunto affix my signature in the presence of two witnesses.

ARTHUR T. WILDEY.

Witnesses:
EDWARD B. STANWOOD,
AUDREY FORD.

Copies of this patent may be obtained for five cents each, by addressing the "Commissioner of Patents, Washington, D. C."